A. W. OJERHOLM.
FISHING TACKLE.
APPLICATION FILED NOV. 22, 1915.

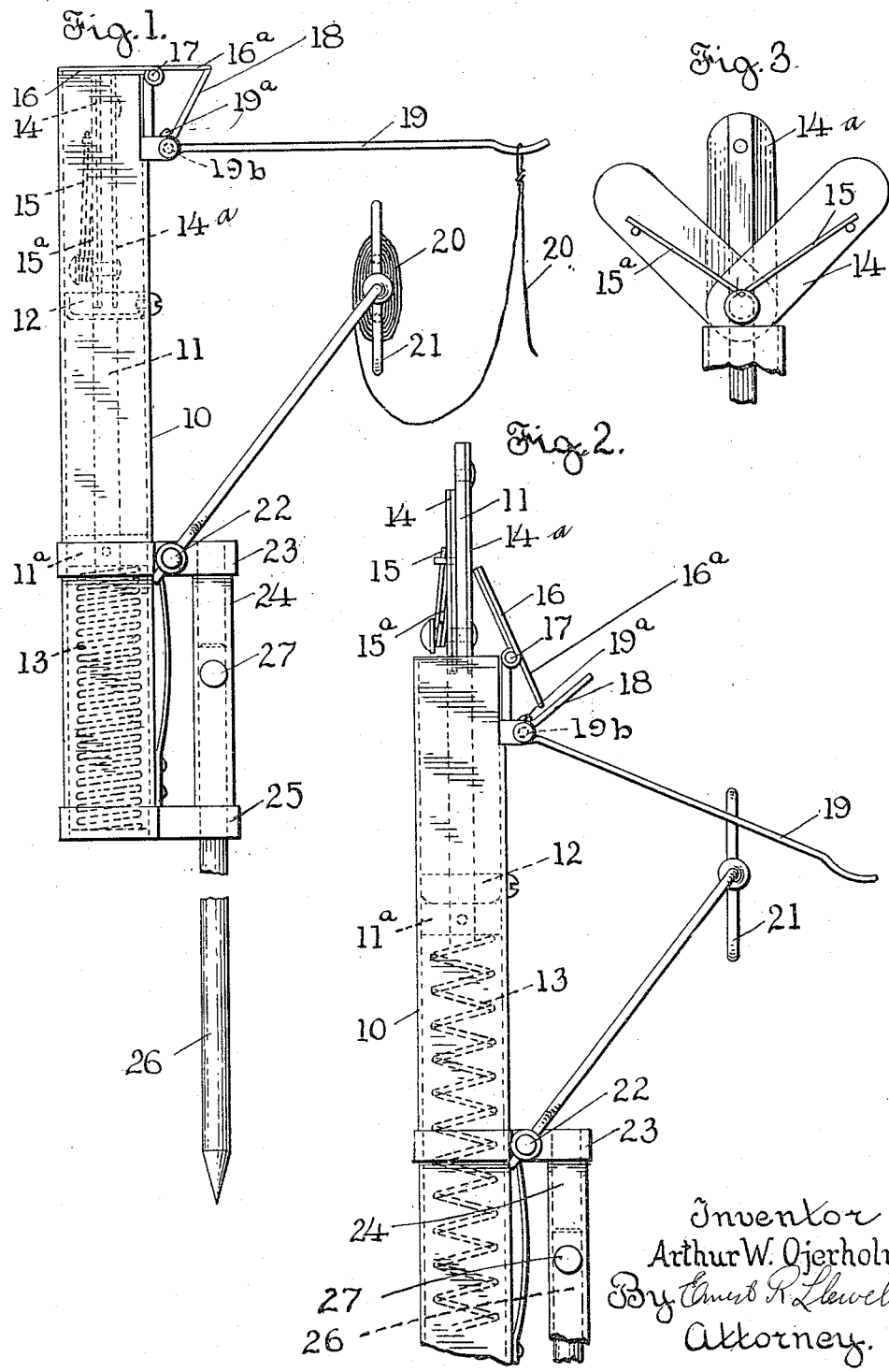

1,212,388.

Patented Jan. 16, 1917.
2 SHEETS—SHEET 2.

Inventor
Arthur W. Ojerholm.
By Ernest R. Llewellyn
Attorney

UNITED STATES PATENT OFFICE.

ARTHUR W. OJERHOLM, OF WORCESTER, MASSACHUSETTS.

FISHING-TACKLE.

1,212,388.  Specification of Letters Patent.  Patented Jan. 16, 1917.

Application filed November 22, 1915. Serial No. 62,694.

*To all whom it may concern:*

Be it known that I, ARTHUR W. OJERHOLM, a citizen of the United States, residing at Worcester, in the county of Worcester and State of Massachusetts, have invented a new and useful Fishing-Tackle, of which the following is a specification.

This invention relates to a fishing tackle and more particularly to fishing tackle used in fishing through ice.

The object of my invention is to provide a simple and efficient device to be used in fishing through ice.

Another object in my present invention is the construction of an ice fishing tackle that may be readily folded in such a manner that several of said tackles may be easily carried.

With these said other objects in view my invention consists in a novel combination and arrangement of parts hereinafter described and more specifically pointed out in the appended claims.

In the accompanying drawings I have shown my invention sufficient to enable those skilled in the art to understand the construction and operation thereof.

Figure 4:
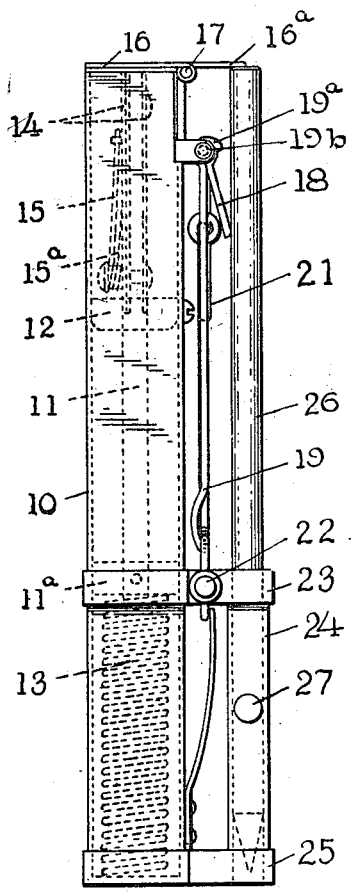
Figure 5:
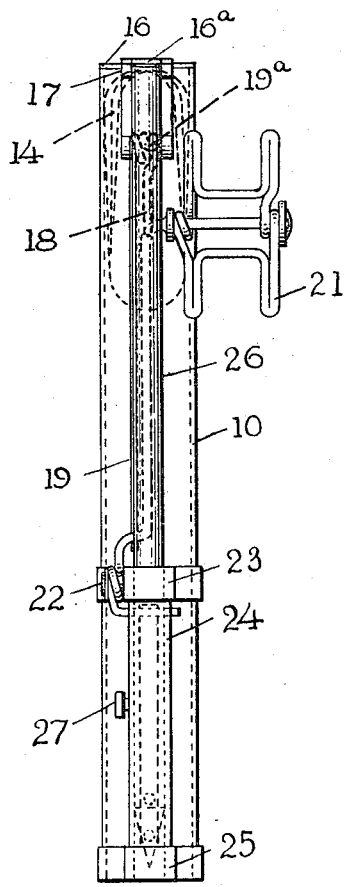

Referring to the drawing:—Figure 1 is a side view of my fishing tackle with the parts extended ready for use. Fig. 2 is a view corresponding to Fig. 1, but shows the device operated, and the signal extended. Fig. 3 is a front view of Fig. 2 viewing in direction of arrow *a;* same figure, with the lower portion broken away. Fig. 4 is a side view corresponding to Fig. 1, but shows the parts in their folded position and, Fig. 5 is a front view of the parts shown in Fig. 4.

In the accompanying drawings 10 is the main tubular body portion, the upper end of which is open.

11 is a shaft mounted within the body portion 10 and guided in a bearing 12 secured within the body portion 10. Said shaft has secured thereto, at its lower end, a collar $11^a$ which is engaged by the upper end of a compression spring 13 contained within the body portion 10 said spring having its opposite end bearing against the closed end of said body portion 10. The shaft 11 has pivoted thereto, at its upper end a plurality of metal flags 14 the central flag $14^a$ in this instance, being rigidly secured to the shaft 10, the flags 14 are forced outwardly, as shown at Fig. 3 by means of springs 15 and $15^a$. The flags 14 and $14^a$, which are slightly less in width than the inside diameter of the body member 10, are forced downwardly within the body member 10 on the shaft 11 compressing the spring 13 the flags 14 and $14^a$ are retained in this position by means of the cap 16 which is pivoted at 17 to the body portion 10, said cap 16 having an extension $16^a$ which is engaged by a trip pin 18 pivoted on a pinion $19^b$ which is secured to the body portion 10. A trip lever 19 is also pivoted on the pinion $19^b$ and has a projection $19^a$ which engages the trip pin 18.

20 is the fish line and is wound upon a reel 21, said reel being pivoted at 22 to a member 23 secured to the body portion 10.

24 is a bearing, extending between the members 23 and 25 and has loosely mounted therein, a rod 26 said rod 26 having its lower end pointed so that it may easily be inserted into the ice. The rod 26 is retained in either its extended or withdrawn position by means of the screw 27 in the bearing 24.

It will readily be seen that when the parts are extended for operation, see Fig. 1, and the line 20 attached to the trip lever 19, a pull, or "bite" as it is commonly termed, will cause the extension $19^a$, of said trip lever 19, to force the trip pin 18 from under the cover extension, $16^a$ the spring 13 will then force the shaft 11 and flags 14 and $14^a$ upwardly as the flags 14 and $14^a$ reach the upper end of the body portion 10, the springs 15 and $15^a$ will cause the flags 14 to move outwardly in opposite directions thereby giving a broader signal surface, see Figs. 2 and 3.

When it is desired to fold the device the trip pin 18 and lever 19 are folded inwardly against body portion 10 the reel 20 is then folded against said body portion, the flags and shaft being retained within the body portion 10 by means of the rod 26 being withdrawn, the inner end engaging the extension $16^a$ of the cover 16, see Fig. 4.

Having thus described my invention it will be evident that many changes and modifications may be made therein by one skilled in the art without departing from the spirit and scope thereof and therefore, I do not wish to be limited to the specific details herein disclosed, but—

What I do claim is:—

1. A device of the type described, including a supporting element, a pivoted tackle reel suspending element sustained in an outwardly and upwardly inclined position therefrom, a trip-element arranged to be sustained in an outstanding position from said supporting element, a pivoted closure for said tubular member having an extension adapted to engage an upwardly and outwardly inclined extension of said trip-element when the latter is in a set or horizontal position, said trip-element being adapted to have applied thereto the fishing line to provide, as a pull or "bite" delivers force to the line to effect the tripping operation.

2. A device of the type described, including a tubular supporting element, a pivoted element adapted to be upheld at an upwardly and outwardly inclined position from said supporting element, a trip-lever pivoted in position upon said supporting element and adapted to be actuated or tripped by the line of a fishing tackle when a pull is exerted thereon, said trip-lever having an upwardly and outwardly inclined extension at its pivoted end, a pivoted closure for said tubular supporting element adapted to engage said inclined extension of said trip-lever, a signal member pivotally attached to a slidable element within said tubular supporting element, and a resilient element within said tubular element adapted to project upwardly said slidable member into contact with said closure and actuate said signal, as the pull is exerted upon said fishing line.

In testimony whereof I have hereunto set my hand, in the presence of two subscribing witnesses.

ARTHUR W. OJERHOLM.

Witnesses:
ERNEST R. LLEWELLYN,
ANNA C. OJERHOLM.

Copies of this patent may be obtained for five cents each, by addressing the "Commissioner of Patents, Washington, D. C."